United States Patent [19]

Pustejovsky

[11] 4,358,921
[45] Nov. 16, 1982

[54] COTTON STRIPPER FINGER ATTACHMENT

[75] Inventor: Dan Pustejovsky, Hillsboro, Tex.

[73] Assignee: Allis-Chalmers Corporation, Milwaukee, Wis.

[21] Appl. No.: 297,771

[22] Filed: Aug. 31, 1981

[51] Int. Cl.³ .............................................. A01D 45/18
[52] U.S. Cl. ........................................ 56/34; 56/127
[58] Field of Search ............... 56/34, 33, 35, 126–130, 56/330, 119

[56] References Cited

U.S. PATENT DOCUMENTS

| | | | |
|---|---|---|---|
| 131,124 | 9/1827 | Sims | 56/34 |
| 955,098 | 4/1910 | Pavy | 56/127 |
| 1,368,014 | 2/1921 | Bauert et al. | 56/127 |
| 2,231,354 | 2/1941 | Wilcox | 56/130 |
| 3,067,561 | 12/1962 | Jezek | 56/34 |

FOREIGN PATENT DOCUMENTS

| | | | |
|---|---|---|---|
| 142946 | 7/1950 | Australia | 56/130 |

*Primary Examiner*—Jay N. Eskovitz
*Attorney, Agent, or Firm*—Charles L. Schwab

[57] ABSTRACT

A cotton stripper of the finger type in which attachments (26, 26') are releasably secured to selected fingers (12, 12') to provide reduced spacing (b) when the attachments (26, 26') are mounted on alternate fingers (12, 21') and further reduced spacing (c) when the attachments (26, 26') are mounted on every finger (26, 26').

6 Claims, 10 Drawing Figures

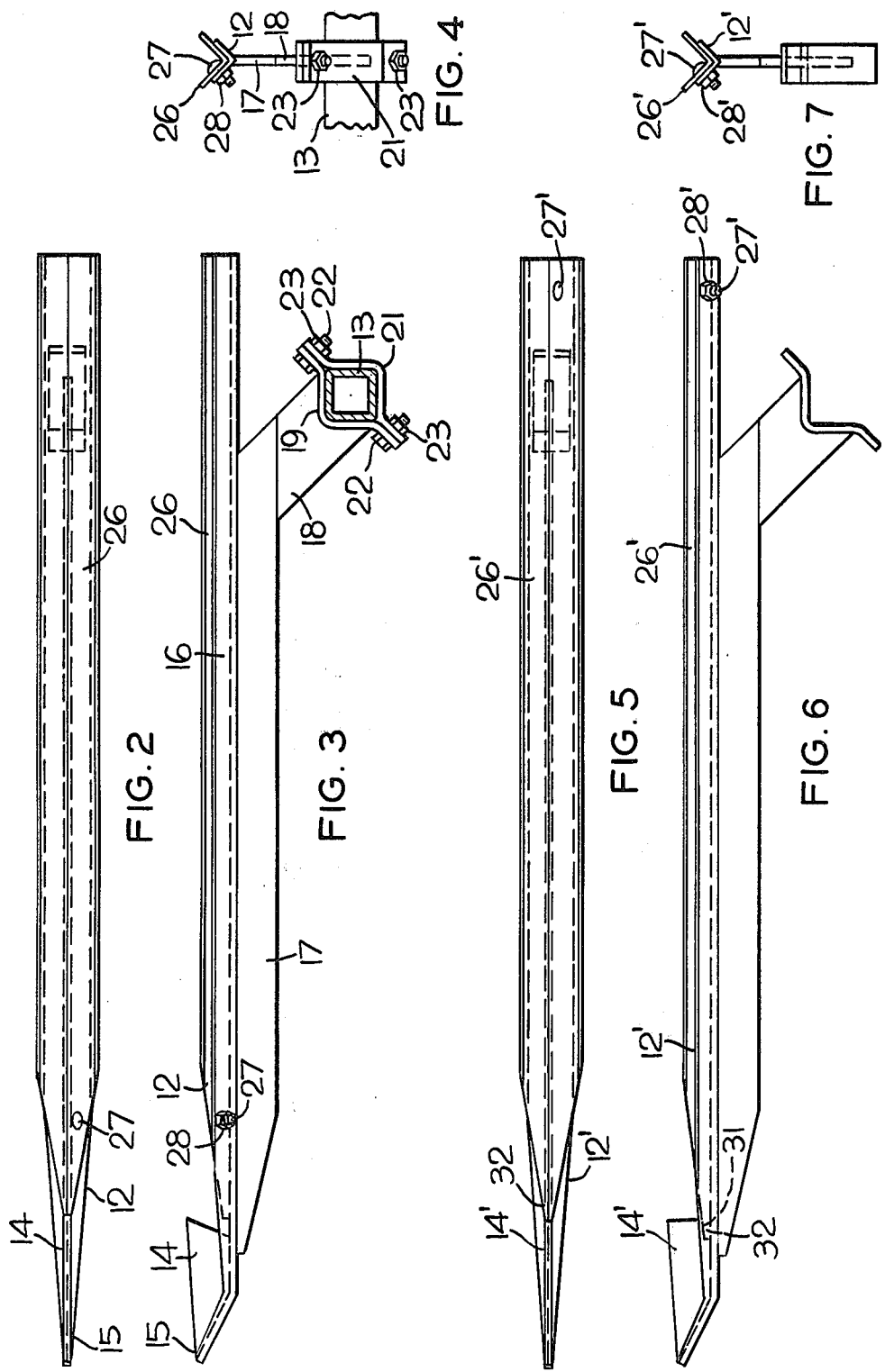

COTTON STRIPPER FINGER ATTACHMENT

BACKGROUND OF THE INVENTION

This invention relates to a finger type cotton stripper and more particularly to an attachment which may be releasably secured to selected fingers of the cotton stripper to change the width of the gap between the fingers.

Heretofore the various methods of changing the gap between the fingers of a cotton stripper have been proposed and used. One common method involves loosening the connection between the fingers and a transverse beam on which they are supported and sliding the fingers transversely on the supporting beam to adjust the spacing and, hence, the gap between the fingers. In this method, some fingers would either be added or removed depending on whether the finger spacing is decreased or increased. Other methods of changing the gap between the fingers include the use of bifurcated and two-part hinged fingers, such as illustrated in U.S. Pat. Nos. 955,098 and 1,368,014.

Brief Description of the Invention

The gap between the fingers of a cotton stripper is adjusted by securing attachments to selected fingers. The attachments are wider than the fingers to which they are attached, thus reducing the gap between the fingers. A first reduced gap between fingers can be achieved by securing a slightly wider attachment to every other finger and an even smaller gap is achieved by securing the attachment to each finger of the cotton stripper. The attachment is preferably secured to the finger by a single releasable fastening means in the form of a bolt and nut. This method of changing the spacing between fingers is considerably more convenient than shifting the fingers along the transverse support bar which entails loosening a pair of attachment bolts at the underside of each finger. If cotton in spaced rows is being harvested, it may only be necessary to use the attachments in the row engaging area of the header where the fingers actually engage the cotton plants.

Brief Description of the Drawings

The invention is illustrated in the drawings in which:

FIG. 2 is a top view of a finger with one version of the attachment of this invention secured thereto;

FIG. 3 is a side view of the finger and attachment shown in FIG. 2;

FIG. 4 is a rear view of the finger and attachment shown in FIG. 3;

FIG. 5 is a top view of a finger with a second version of the attachment of this invention secured thereto;

FIG. 6 is a side view of the finger and attachment shown in FIG. 5;

FIG. 7 is a rear view of the finger and attachment shown in FIG. 6;

Detailed Description of the Invention

Figure 1:
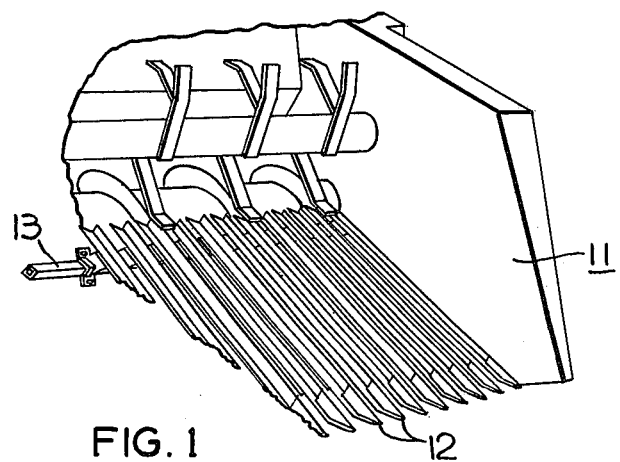
FIG. 1 is a partial pictorial view of a self-propelled finger type cotton stripper.

Referring to FIG. 1, a self-propelled mobile cotton stripper 11 having a plurality of transversely spaced fingers 12 is illustrated. It is in this type cotton stripper that my invention has particular utility. The finger type cotton stripper 11 includes a transverse support bar 13 to which the elongated fingers 12 are individually attached. Referring also to FIGS. 2 and 3, the finger 12 includes a point 15 with a vertical fin 14. The main body 16 of the finger 12 is V-shaped in cross-section and has a downwardly extending keel 17 welded to the downwardly directed apex of the main part 16. A vertical bracket 18 is welded to the keel 17 and its lower end is rigidly secured as by welding to one element 19 of a split coupling which includes a second element 21 secured thereto by releasable fastening means in the form of the bolts 22 and nuts 23. As shown in FIGS. 3 and 4, the releasable fastening means 22, 23 secure the finger 12 to the transverse support beam 13. Heretofore, it was customary, when it was desired to change the gap between the fingers, to change the spacing of the fingers 12. This was done by loosening the releasable fastening means for each of the fingers and shifting the finger 12 transversely, that it, shift it laterally along the longitudinal dimension of the support beam 13. However, the present invention obviates the necessity of loosening the fastening means securing the fingers to their support beam 13. Instead, a novel V-shaped attachment 26 is laid on top of the main body 16 of the finger 12 and is releasably secured near the front end of the finger 12 by a bolt 27 and nut 28. The bolt passes through aligned openings, not shown, in the attachment 26 and finger 12. As illustrated, the attachment 26 is slightly wider than the main body 16 of the finger 12 and overlies the entire main body. An advantage of placing the releasable fastening means 27, 28 near the front end of the fingers 12 is it makes them readily accessible from the front of the stripper thereby facilitating installation and removal of the elongated attachments.

In the version of the invention shown in FIGS. 5, 6 and 7, the upstanding fin 14' of the finger 12 is of a slightly different configuration at its rear end in that it presents a horizontal notch 31 for receiving a front end portion 32 of the attachment 26'. This prevents vertical displacement of the front end of the attachment 26' relative to the associated finger 12'. The elongated attachment 26' extends forward a slightly greater distance than the attachment 26 in order to engage the notch 31. Instead of being releasably secured at its front end, the attachment 26' is secured at its rear to a rear part of the finger 12' by releasable fastening means 27', 28'. In the version of the invention illustrated in FIGS. 5–7, both the front and rear ends of the attachment 26' are held in place on the finger 12'.

Figure 8:
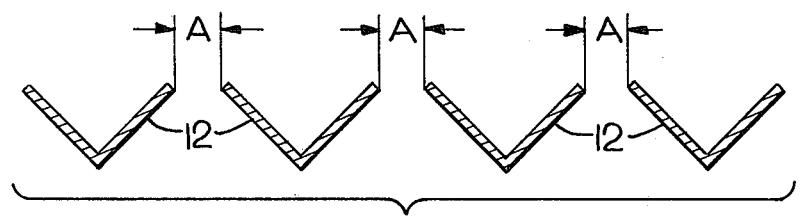
FIG. 8 is a section through the fingers of the cotton stripper shown in FIG. 1 taken in a plane transverse to the longitudinal dimension of the finger.
Figure 9:
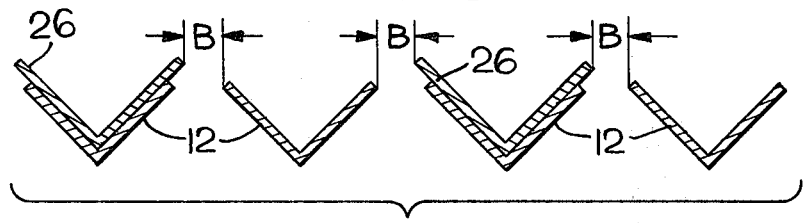
FIG. 9 is a view similar to FIG. 8 showing the attachments of the present invention secured to every other finger.
Figure 10:
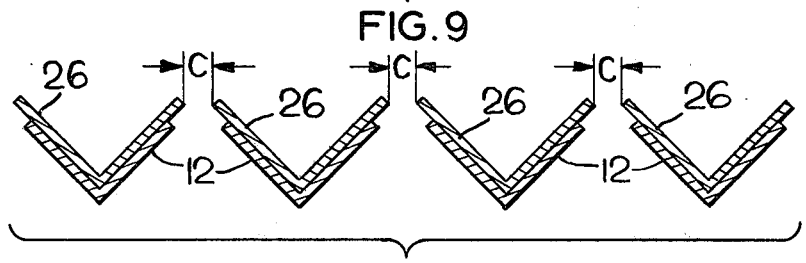
FIG. 10 is a view similar to FIGS. 8 and 9 but showing the attachments of the present invention secured to each finger.

My finger attachment can be utilized to change the gap between the boll stripping fingers, without adjusting the spacing of the fingers 12. The stripper as illustrated in FIGS. 1 and 8 does not have attachments secured thereto. In this condition, as illustrated in FIG. 8, a gap A exists between the fingers 12. The gap may be reduced as indicated in FIG. 9 by securing the attachment 26 of the present invention to every other finger 12, thereby producing a gap B. When the attachment 26 is added to each of the fingers 12, as illustrated in FIG. 10, the gap is further reduced to dimension C. Thus the attachment 12 can be readily utilized to obtain a total of 3 finger spacings in a single machine. This permits the operator to obtain optimum harvesting in different crop conditions. This installation and removal of my attachment through use of a single nut and bolt requires considerably less time than the prior practice of shifting the fingers laterally on the support beam 13 to change their spacing.

The embodiments of the invention in which an exclusive property or privilege is claimed are defined as follows:

1. In a cotton stripper having a header, the combination comprising:
    a plurality of transversely spaced elongated boll stripping fingers secured to said header and lying side by side at predetermined spacing and extending forwardly in a downwardly inclined plane, each of said fingers including an elongated main body of V-shaped cross-section with a downwardly directed apex, said main bodies being spaced from one another to provide boll stripping gaps therebetween, and
    elongated attachments of V-shaped cross-section nested on top of said main bodies of selected fingers, said attachments being of greater width than the main bodies of said selected fingers whereby the gap between the finger to which an attachment is mounted and an adjacent finger is less than the gap between said main bodies of said fingers without said attachment.

2. The cotton stripper of claim 1 and further comprising releasably fastening means securing each of said attachments to its associated finger.

3. The cotton stripper of claim 2 wherein said releasable fastening means is located near the forward end of said finger.

4. The cotton stripper of claim 1 wherein an attachment is mounted on substantially every other finger in the area of the header engaging the cotton plants.

5. The cotton stripper of claim 1 wherein an attachment is attached to substantially all the fingers in the area of the header engaging the cotton plants.

6. The cotton stripper of claim 1 wherein said selected fingers each includes an upstanding fin at its forward end and said fin includes a horizontal notch at its rear end in which the front end of said attachment is received.

* * * * *